(12) United States Patent
Okuno

(10) Patent No.: US 9,521,056 B2
(45) Date of Patent: Dec. 13, 2016

(54) COMMUNICATION SYSTEM

(71) Applicant: HITACHI, LTD., Tokyo (JP)

(72) Inventor: Michitaka Okuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 129 days.

(21) Appl. No.: 14/508,379

(22) Filed: Oct. 7, 2014

(65) Prior Publication Data

US 2015/0103658 A1    Apr. 16, 2015

(30) Foreign Application Priority Data

Oct. 11, 2013   (JP) ................................. 2013-213818

(51) Int. Cl.

| H04L 12/26 | (2006.01) |
|---|---|
| H04W 28/02 | (2009.01) |
| H04W 80/06 | (2009.01) |
| H04L 12/801 | (2013.01) |
| H04L 12/24 | (2006.01) |
| H04L 29/08 | (2006.01) |

(52) U.S. Cl.
CPC ........... *H04L 43/0835* (2013.01); *H04L 67/28* (2013.01); *H04W 28/0273* (2013.01); *H04W 28/0289* (2013.01); *H04W 80/06* (2013.01); *H04L 41/5067* (2013.01); *H04L 43/0882* (2013.01); *H04L 43/16* (2013.01); *H04L 47/14* (2013.01); *H04L 67/322* (2013.01)

(58) Field of Classification Search
CPC ..................... H04W 28/0289; H04W 28/0273; H04W 80/06; H04W 28/0252; H04W 28/08; H04W 4/08; H04L 67/28; H04L 43/0835;H04L 47/14; H04L 43/16; H04L 43/0882; H04L 67/322; H04L 41/5067; H04L 47/10; H04L 47/12; H04L 67/1002

See application file for complete search history.

(56) References Cited

U.S. PATENT DOCUMENTS

| 2012/0140632 | A1* | 6/2012 | Norp | ...................... H04L 47/10 370/235 |
|---|---|---|---|---|
| 2012/0213069 | A1 | 8/2012 | Oguchi | |
| 2012/0250509 | A1* | 10/2012 | Leung | ................... H04W 76/04 370/235 |

(Continued)

FOREIGN PATENT DOCUMENTS

| JP | 2012-175561 A | 9/2012 |
|---|---|---|
| JP | 2012-191372 A | 10/2012 |

*Primary Examiner* — Charles C Jiang
*Assistant Examiner* — Rose Clark
(74) *Attorney, Agent, or Firm* — Mattingly & Malur, PC

(57) ABSTRACT

A control device determines whether communications that a base station accommodates are congested, based on obtained information, and identifies a terminal that is accommodated in the base station in which it is determined that the communications are congested, as a terminal of which communications a proxy device is to control. The proxy device controls communications between the base station and a server, by using a protocol that acknowledges that the data has reached a reception side, calculates a loss rate in communications by the identified terminal are to be discarded, by utilizing acknowledgement packets which are used by the protocol, and relays a communication of the identified terminal, by a transmission band which has been reduced by the calculated loss rate portion.

20 Claims, 9 Drawing Sheets

(56) References Cited

U.S. PATENT DOCUMENTS

2014/0198637 A1\* 7/2014 Shan ................ H04W 52/243
  370/229
2015/0009826 A1\* 1/2015 Ma .................... H04W 28/0268
  370/235

\* cited by examiner

420

| USER | HIGH QoE CONTRACT | HIGH QoE UPPER LIMIT BAND | OPTION (EXAMPLE: HIGH QoE TARGET) |
|---|---|---|---|
| | 421 | 422 | 423 | 424 |
| A | YES | 15 Mbps | ALL COMMUNICATIONS |
| B | NO | -- | -- |
| C | YES | 15 Mbps | SERVICE PROVIDER 2 ACCESS |
| D | YES | 15 Mbps | SERVICE PROVIDER 1 ACCESS |
| E | NO | -- | -- |
| TERMINAL CONTRACT INFORMATION ||||

| USER | HIGH QoE UPPER LIMIT BAND | OPTION (EXAMPLE: HIGH QoE TARGET) |
|---|---|---|
| | 3651 | 3652 | 3653 |
| A | 15 Mbps | ALL COMMUNICATIONS |
| C | 15 Mbps | SERVICE PROVIDER 2 ACCESS |
| D | 15 Mbps | SERVICE PROVIDER 1 ACCESS |
| APPLICATION INFORMATION |||

FIG. 4B

| SERVICE PROVIDER | NETWORK IDENTIFIER | HIGH QoE UPPER LIMIT BAND | OPTION (EXAMPLE: HIGH QoE TARGET) |
|---|---|---|---|
| 1 | http://ott1.com | 10 Mbps | ALL ACCESSES |
| 2 | http://ott2.com | 5 Mbps | ALL ACCESSES |
| 3 | http://ott3.com | 5 Mbps | ALL ACCESSES |
| 4 | http://ott4.com | 10 Mbps | APPLICATION 1 |
| 5 | http://ott5.com | 5 Mbps | APPLICATION 1 |
| SERVICE PROVIDER CONTRACT INFORMATION | | | |

FIG. 8

COMMUNICATION SYSTEM

CLAIM OF PRIORITY

The present application claims priority from Japanese patent application JP2013-213818 filed on Oct. 11, 2013, the content of which is hereby incorporated by reference into this application.

BACKGROUND

The present invention relates to a communication system.

In recent years, fast popularization of smartphones, tablet terminals, and the like has resulted in a rapid increase in mobile traffic in the network. Responding to this situation, in radio network that forwards the mobile traffic, a high-speed radio communication such as LTE (Long Term Evolution) and WiMAX have started to be popularized in place of 3G. In the case of using such a high-speed radio communication, users can enjoy a comfortable communication like the conventional cable communication, in the environment in which wireless link errors (packet losses) are unlikely to occur, or the environment in which accesses are not congested.

On the other hand, in the case where a radio network is in the environment in which wireless link errors (packet losses) are likely to occur, or the environment in which accesses are congested, even when the high-speed radio communication is used, transmission throughput reduces in the radio network, and Quality of Experience (QoE) is lowered, because of characteristics of the generally-used TCP/IP (Transmission Control Protocol/Internet Protocol) communication.

In order to improve the quality of experience, it is important to secure a communication band in the radio network, and establish a state that the secured communication band can be utilized to an upper limit even in the congestion status. In the light of this importance, conventionally, there has been proposed a task of providing a radio resource allocation method by which a service quality can be controlled according to a characteristic of dataflow and by which it is possible to improve fairness of a user quality of experience among users who utilize the same type of application services (see JP2012-191372A, for example).

JP 2012-191372A discloses that a network including base station devices includes: a required QoE determination part for estimating required QoE to be requested by users; a data flow characteristic analysis part for analyzing the characteristics of data flows; a target Quality of Service (QoS) determination part for determining target QoS, based on the required QoE and the data flow characteristics; and a radio resource allocation part for determining radio resource amounts, based on the target QoS.

JP2012-175561A discloses a problem of improving communication throughput according to environment in a transmission control method. It further discloses a transmission control method, in which each of a transmission source and transmission destination communication devices has a transmission control protocol including a plurality of congestion control functions corresponding respectively to a plurality of congestion control systems, and communicates mutually by using the transmission control protocol, has a step of forwarding at least one of a plurality of parameters showing an action state of a first congestion control function retained by the transmission control protocol to a parameter showing an action state of a second congestion control function when the transmission source and transmission destination communication devices switch from the first congestion control function to the second congestion control function.

SUMMARY

In the case where the technique described in JP2012-191372A is used and the protocol like the TCP/IP is used in the radio network, it is not possible to prevent reduction in the transmission throughput in the case of excessive retransmission of packets.

In the case where the technique described in JP2012-175561A is used, it becomes necessary to install the function described in JP2012-175561A in all radio terminals and in all servers, which results in an increase in introduction cost.

In order to comfortably utilize the radio network, it is important to avoid losing the user quality of experience (QoE). On the other hand, because there is a limit to facility investment fund of a network operator who provides the radio network, it is not realistic for the network operator to take excessive introduction cost for the purpose of improving the user quality of experience. In many cases, in the non-congestion status, because the recent radio network using the high-speed radio communication such as the LTE can easily obtain a comfortable quality of experience like the quality of the cable communication, the problem may be limited to the congested time.

An object of the present invention is to reduce the lowering of the user quality of experience (QoE) even at a congested time, without taking excessive introduction cost in the radio network.

An representative example of the present invention is a communication system configured to forward data to be transmitted and received by a terminal, the communication system comprising: a base station configured to communicate with the terminal by radio transmission; a server configured to provide services to the terminal; a proxy device configured to control communications between the base station and the server; and a control device configured to obtain information for determining whether communications that the base station accommodates are congested, wherein the control device is configured to determine whether the communications that the base station accommodates are congested, based on the obtained information, and identify a terminal that is accommodated in the base station in which it is determined that the communications are congested, as a terminal of which communications the proxy device is to control, and the proxy device is configured to control communications between the base station and the server, by using a protocol that acknowledges that the data has reached a reception side, calculate a loss rate in communications by the identified terminal are to be discarded, by utilizing acknowledgement packets which are used by the protocol, and relay a communication of the identified terminal, by a transmission band which has been reduced by the calculated loss rate portion.

According to an aspect of the present invention, it becomes possible to reduce the lowering of the quality of experience (QoE) in communication without increasing the introduction cost.

Objects, configurations, and effects of this invention other than those described above will be clarified in the description of the following embodiments.

BRIEF DESCRIPTION OF THE DRAWINGS

FIG. 4A is an explanatory diagram showing the terminal contract information according to Embodiment 1;

FIG. 4B is an explanatory diagram showing the application information held by the proxy device according to Embodiment 1;

FIG. 8 is an explanatory diagram showing the service provider contract information according to Embodiment 2.

DETAILED DESCRIPTION OF THE EMBODIMENTS

Hereinafter, embodiments of this invention will be described in detail with reference to the drawings. The elements common to the drawings are assigned the same reference signs.
Embodiment 1

In the present embodiment, there is introduced a proxy device that optimizes the communication in order to reduce the lowering of the quality of experience (QoE) in communication. A communication system according to the present embodiment controls a communication quality by improving the quality of experience (QoE) in communication, without increasing the number of the proxy devices to be introduced (introduction cost).

Figure 1:
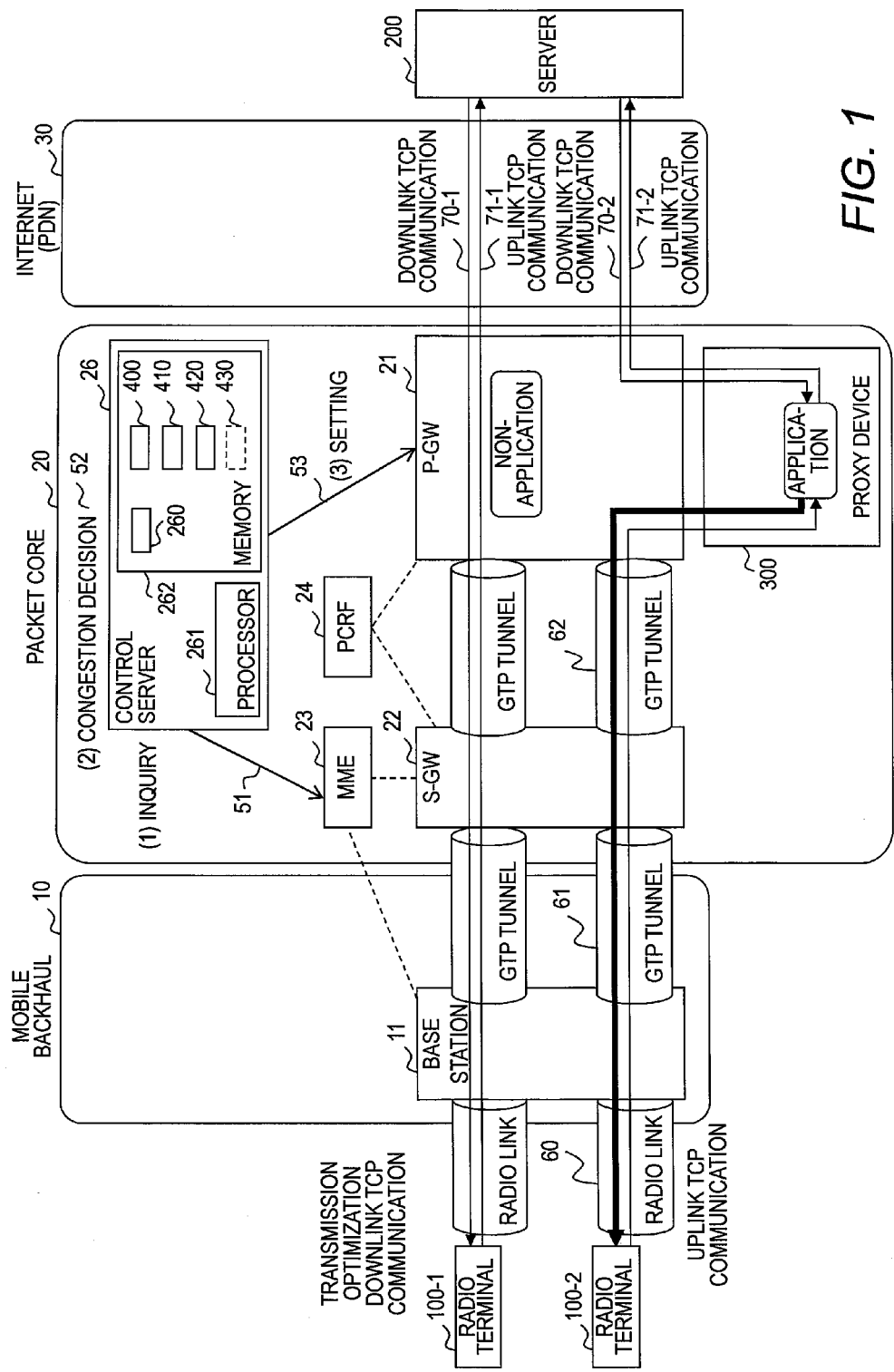
FIG. 1 is a block diagram showing a communication system according to Embodiment 1.

FIG. 1 is a block diagram showing a communication system according to Embodiment 1.

The communication system according to Embodiment 1 includes a mobile backhaul 10, a packet core 20, an internet 30, and at least one server 200. The mobile backhaul 10 and the packet core 20 configures a network system that uses a high-speed radio communication technique such as the LTE. The internet 30 is a PDN (Public Data Network), for example. The server 200 is a computer that provides services.

The mobile backhaul 10 is configured by at least one base station 11 that accommodates at least one radio terminal 100, and a plurality of switches (not shown) for connecting the base station 11 to the packet core 20.

The packet core 20 includes at least one S-GW 22, at least one P-GW 21, an MME 23, a PCRF 24, a control server 26, and at least one proxy device 300.

The S-GW 22 is installed between the base station 11 and the P-GW 21, and forwards user data. The P-GW 21 is installed between the S-GW 22 and the internet 30, and forwards the user data.

The MME 23 performs movement management and authentication (security control) of the radio terminal 100, and setting of a user data transmission path. The PCRF 24 determines a policy of a QoS (Quality of Service) for performing a communication quality control in the P-GW 21 and the S-GW 22, a charge method, and the like.

The P-GW 21 and the S-GW 22 have a role of a gateway in the radio network, and the MME 23 and the PCRF 24 have a role of a managing device in the radio network.

The control server 26 and the proxy device 300 are devices that control the quality of experience in communication in the present embodiment. The control server 26 obtains, by outputting an inquiry 51, information for determining whether communications that the base station 11 accommodates are congested.

The control server 26 determines, based on the obtained information, whether the communications that the base station 11 accommodates are congested (a congestion decision 52), and identifies, based on the congestion decision 52, the radio terminal 100 to which a high QoE communication described later is to be applied. Then, the control server 26 transmits to the P-GW 21, the information that indicates the radio terminal 100 to which the high QoE communication is to be applied (a setting 53).

The proxy device 300 is a device that controls the quality of a communication to the radio terminal 100. The proxy device 300 shown in FIG. 1 is connected to the P-GW 21 by an out-of-line configuration, and transmits/receives data via the P-GW 21.

The P-GW 21 forwards, following the setting 53, the communication of the radio terminal 100 to the server 200, the proxy device 300, or the S-GW 22. The proxy device 300 controls the forwarded communication, by a method to be described later, so as to improve effective throughput of the communication of the radio terminal 100 to which the high QoE communication is applied.

The control server 26 is a computer having a processor 261 and a memory 262, and has a congestion determining unit 260 as a functioning unit. The congestion determining unit 260 executes the inquiry 51, the congestion decision 52, and the setting 53.

The congestion determining unit 260 is installed by at least one program, and may also be installed by at least one physical device.

The control server 26 according to Embodiment 1 has communication information 400, congestion information 410, and terminal contract information 420, in the memory 262. Also a control server 26 according to a second embodiment further has service provider contract information 430. A control server 26 according to Embodiment 1 does not need to have the service provider contract information 430.

The communication information 400 is the information obtained by the inquiry 51. The congestion information 410 indicates a result of the congestion decision 52. The terminal contract information 420 is the information that indicates the radio terminal 100 of a user who has made a contract of a high QoE communication service, and the terminal contract information 420 indicates the radio terminal 100 to which the high QoE communication is applied.

The communication system according to the present embodiment is a system that the user utilizes in order to receive provision of services from at least one service provider. One service provider has at least one server 200. To simplify the description, the server 200 shown in FIG. 1 is one server 200 that one service provider has.

There may be also a plurality of radio terminals 100. However, to simplify the description, FIG. 1 shows two radio terminals 100 (100-1 and 100-2). Further, the communication system according to the present embodiment may also include a plurality of the base stations 11, the S-GW 22, the P-GW 21, and the proxy devices 300. However, to simplify the description, the communication system in FIG. 1 is shown to have only one base station 11, one S-GW 22, one P-GW 21, and one proxy devices 300.

When the user uses the radio terminal 100 to browse a web site and the like provided by the server 200 of the service provider, a TCP/IP communication occurs between the radio terminal 100-2 and the server 200.

This TCP/IP communication is performed via a logical path called a bearer that is provided by an LTE system. The bearer is configured by a GTP (GPRS Tunneling Protocol) tunnel 62 between the P-GW 21 and the S-GW 22, a GTP tunnel 61 between the S-GW 22 and the base station 11, and a radio link 60 between the base station 11 and the radio terminal 100.

In the status that a power supply of the radio terminal 100 is kept on and that the radio terminal 100 is not performing a data communication, the GTP tunnel 62 is maintained, and the radio link 60 and the GTP tunnel 61 are released. Therefore, in the present embodiment, the number of radio links 60 or the number of GTP tunnels 61 is used as the number of communication bearers that indicates the number of active bearers which are performing data communications.

The TCP/IP communication is configured by a downlink TCP communication 70 (70-1 and 70-2) from the server 200 to the radio terminal 100, and an uplink TCP communication 71 (71-1 and 71-2) from the radio terminal 100 to the server 200. The downlink TCP communication 70 is a downlink communication, and the uplink TCP communication 71 is an uplink communication.

In the case of using the LTE, the communication system is substantially improved in the communication throughput as compared with the 3GPP in the last generation, and maximum throughput similar to that in a cable network can be obtained in many cases because of the specification of the LTE.

However, when the high-speed radio network which uses the LTE or the like is actually utilized, what is important for the user is not momentary maximum throughput but effective throughput during a normal period. In the high-speed radio network such as the LTE, momentary maximum throughput is improved. Therefore, depending on the situation, the problem of a substantial reduction in the quality of experience QoE becomes noticeable. Specifically, this problem occurs because of a noticeable reduction in the effective throughput as compared with the maximum throughput, and such a problem does not occur in the radio network of a narrow band.

Particularly, in the TCP/IP communication in which secure transfer of data is guaranteed by the transport layer, there is a high possibility of the occurrence of the problem that the effective throughput becomes noticeably lower than the maximum throughput.

The TCP/IP communication is a communication in which an IP packet is transmitted and received by the transport protocol which is called TCP. A main characteristic of the TCP is that data arrival guarantee is realized by retransmitting an unarrived packet and that an excessive transmission of packets is avoided by congestion control.

The congestion control of the TCP is the control of reducing transmission band at a constant rate. Therefore, in the case of communicating over a long distance or in the case of frequent occurrence of a packet loss in one communication path, the transmission band is reduced at a plurality of times at a constant rate by the congestion control of the TCP. Consequently, the problem of a noticeable reduction in the effective throughput occurs.

For example, in the radio network of the LTE, in the case where a small number of radio terminals 100 are accommodated in the base station 11, congestion is unlikely to occur in the radio link 60. Therefore, a packet loss attributable to the congestion is unlikely to occur, and the original throughput of the LTE can be easily enjoyed. On the other hand, in the case where many radio terminals 100 are accommodated in the base station 11, the radio links 60 are congested, and therefore, a packet loss is likely to occur and the effective throughput is likely to be reduced.

In the present embodiment, in order to suppress the reduction in the effective throughput of the TCP/IP communication in the radio network, that is, the reduction in the quality of experience QoE, the proxy device 300 having the function of optimizing the transmission by the TCP is used.

The proxy device 300 according to the present embodiment suppresses the reduction in the effective throughput by reducing only a packet discarded portion from the transmission band, instead of reducing the transmission band at a constant rate at the congestion control time of the TCP.

In the case where the TCP is used in the radio network, the proxy device 300 calculates a packet loss rate, by using ACK (Acknowledgement) as an acknowledgement packet that indicates arrival of a transmitted packet at a reception side, and SACK (Selective Acknowledgement) that indicates a starting end and a terminal end of a discontinuous portion out of packets received at the reception side.

The ACK and the SACK are the packets that are transmitted from the reception side to the transmission side, and the SACK accompanies the ACK.

A method for the transmission side of the packet of the TCP/IP communication, that is, the proxy device 300 according to the present embodiment, to calculate the packet loss rate will be described. As variables for calculating the packet loss rate, there are four kinds including snd as a number of packets transmitted by the transmission side, ack as a number of packets of the ACK received by the transmission side, rts as a number of packets that the transmission side has been requested to retransmit, and sack.dup as a number of packets of the SACK in the case where the value of the SACK of the SACK packets received by the transmission side is the same as the value of the SACK received immediately before.

When the packet loss rate is low, snd>ack+rts is established. When snd>ack+rts, the proxy device 300 calculates a packet loss rate=rts/snd (Equation 1).

On the other hand, when the packet loss rate is high, snd<=ack+rts is established. When snd<=ack+rts, the proxy device 300 calculates a packet loss rate=1−(ack−sack.dup)/snd (Equation 2).

Snd, ack, rts, and sack.dup are the numbers that are obtained during a predetermined period, and the proxy device 300 calculates the packet loss rate at an arbitrary time interval. After the calculation, the values of snd, ack, rts, and sack.dup are returned to zero, and the number of packets is measured during a next predetermined period.

Then, the proxy device 300 according to the present embodiment reduces the transmission band (a data transmission quantity) by the calculated packet loss rate, so that it becomes possible to realize the effective throughput higher than the throughput of the method of decreasing the transmission band at a constant rate, without excessively reducing the transmission band.

In the case where the proxy device 300 according to the present embodiment has been applied, a communication from the proxy device 300 to a desired destination, for example, transmission of packets from the server 200 toward the radio terminal 100, can be optimized, by the method using the above packet loss rate. Therefore, according to the present embodiment, even when a packet loss occurs in the communication path, the effective throughput improves as compared with the TCP/IP communication in which the transmission band is decreased at a constant rate.

The TCP/IP communication in which the effective throughput is improved by the method according to the present embodiment will be hereinafter called a high QoE communication. The control for applying the high QoE communication will be called a TCP transmission optimization control, in the present embodiment. A service of providing the high QoE communication to the user will be described as a high QoE communication service.

The proxy device 300 can apply the TCP transmission optimization control to a plurality of TCP/IP communication sessions, by managing a plurality of TCP/IP communications on the incorporated memory (to be described later). For example, by installing one proxy device 300 according to the present embodiment, the TCP transmission optimization control can be applied to communications of 6000 sessions or 12,000 sessions. The number of sessions depends on the processing capacity and the memory quantity of the processor installed in the proxy device 300.

From the standpoint of a network operator who operates the radio network, it is rational that the proxy device 300 according to the present embodiment is applied to only the radio terminal 100 of the user who has made a contract of the high QoE communication service to which a proper charge is paid. This is because when the proxy device 300 processes communications of all radio terminals 100, the introduction cost of the proxy device 300 becomes high. Further, this is because when the effective throughput of all communications has been improved, congestion of the radio network is promoted.

Further, when congestion is not generated in the high-speed radio network like the LTE, the effective throughput is unlikely to be lowered. Therefore, in order to rationally reduce the introduction cost, there is required the proxy device 300 that applies the high QoE communication only when congestion is generated.

For example, a case where all radio terminals 100 constantly generate congestion is a rare phenomenon. Normally, congestion occurs when a large number of people carrying the radio terminals 100 are densely clustered, such as at a commuting time or at an event occurrence time. In such a case, not a whole radio network is congested, but a specific base station 11 is congested in many cases.

The proxy device 300 described below identifies the radio terminal 100 of the user who has made a contract of the high QoE communication service, out of the radio terminals 100 accommodated in the base station 11 in which it has been determined that accommodated communications are in a congested state, and applies the high QoE communication to only the identified radio terminal 100. When the identified radio terminal 100 has moved to the inside of a communication zone of the base station 11 which is not congested, the proxy device 300 according to the present embodiment cancels the high QoE communication. With this arrangement, the proxy device 300 can apply resources for the TCP transmission optimization control to the radio terminal 100 of the user who has made a contract of other high QoE communication service.

The proxy device 300 according to the present embodiment may be installed on a path between the base station 11 and the server 200 (an inline method). Alternatively, the proxy device 300 according to the present embodiment may be installed by a One Arm connection by which a packet can be redirected from the above-mentioned path and thereafter can be returned to the path. A configuration by the One Arm connection is an out-of-line configuration.

In the case where the proxy device 300 is in the out-of-line configuration, a switch on the P-GW 21 or on the above-mentioned path changes by the own routing setting, so that the communication to which the high QoE communication is applied is via the proxy device 300, or cancels the application. With this arrangement, because the application or cancellation (non-application) of the high QoE communication of the proxy device 300 is realized, the proxy device 300 does not need to determine for each communication whether to apply or deny the application of the high QoE communication. As a result, the load on the processing by the proxy device 300 reduces.

In the following embodiment, the proxy device 300 and the P-GW 21 are mainly in the out-of-line configuration by the One Arm connection. Other configurations will be described later.

The control server 26 identifies the communication to which the high QoE communication is to be applied or the communication to which the application of the high QoE communication is canceled (non-application). Although the control server 26 is installed in the packet core 20 in FIG. 1, the control server 26 is not necessarily required to be installed in the packet core 20.

Figure 2:
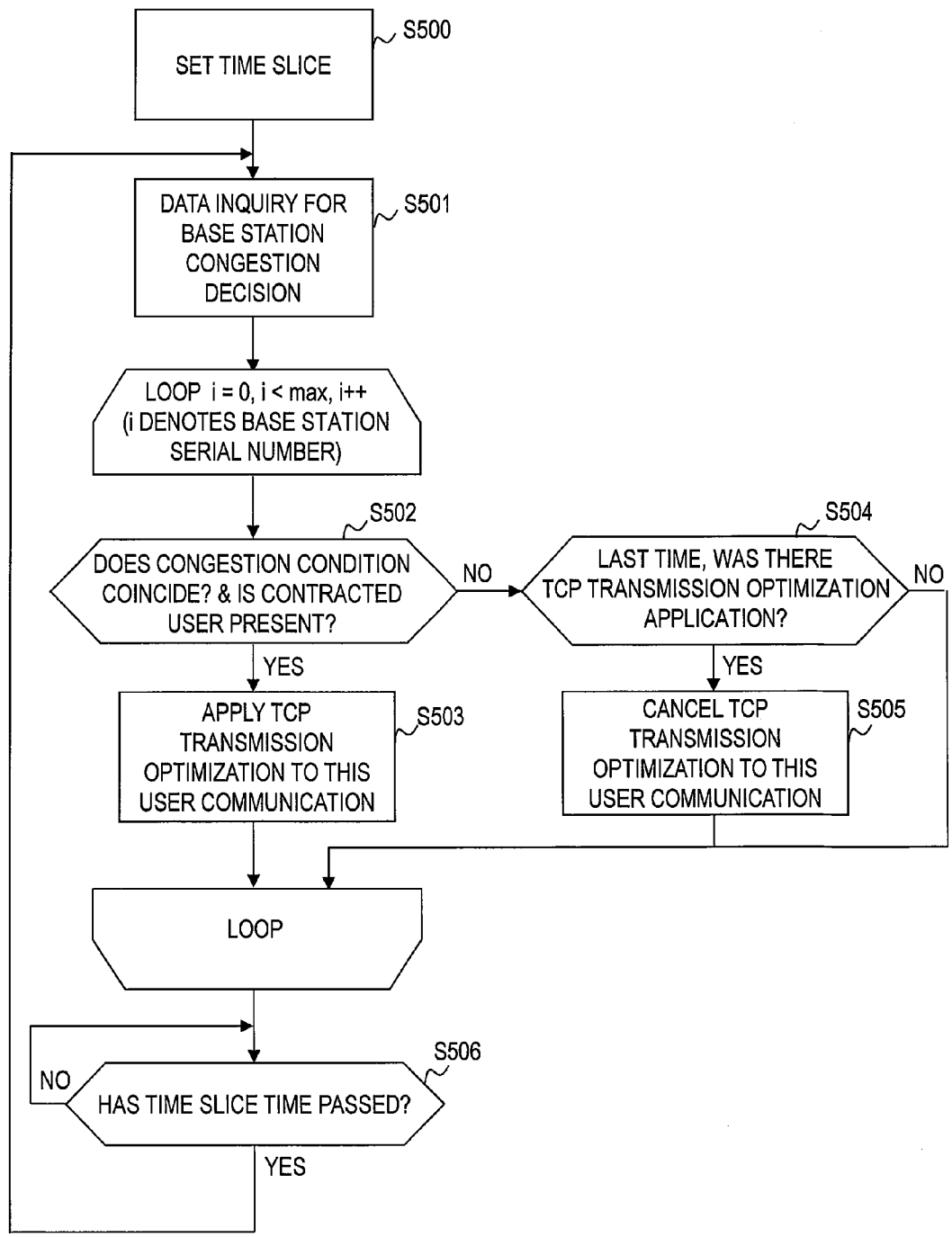
FIG. 2 is a flowchart showing an application processing and a cancellation processing of the high QoE communication according to Embodiment 1.

FIG. 2 is a flowchart showing an application processing and a cancellation processing of the high QoE communication according to Embodiment 1.

Following the flowchart shown in FIG. 2, the control server 26 performs the application processing and the cancellation processing of the high QoE communication according to the present embodiment. First, the network operator sets a time slice for the application and the cancellation of the high QoE communication (S500).

After the user transmitted a constant quantity or more of packets, the user determines the quality of experience. For this purpose, the time slice for executing the processing shown in FIG. 2 is about a few seconds for a minimum. Preferably, the time slice is within about 15 minutes so that the processing shown in FIG. 2 is properly executed accordingly even when a congestion status has changed. For example, the time slice is preferably about five minutes.

At the interval of the time slice which is set in S500, the inquiry 51, the congestion decision 52, and the setting 53 are executed.

After the time slice has been set, the congestion determining unit 260 of the control server 26 inquires about the information for determining the congestion status (S501). For example, the congestion determining unit 260 transmits the inquiry 51 to the MME 23, and obtains, from the MME 23, at least the information of a bearer number of the radio terminal 100 and the base station 11 in which the radio terminal 100 is accommodated. One radio terminal 100 may accommodate a plurality of bearers.

In S501, the congestion determining unit 260 may transmit the inquiry 51 to each base station 11, and obtain the information of the communication information 400 from each base station 11. When each base station 11 can provide information corresponding to the congestion information 410, the congestion determining unit 260 may obtain the information by transmitting the inquiry 51 to each base station 11.

The congestion determining unit 260 stores the information obtained in S501, into the communication information 400.

After S501, the congestion determining unit 260 executes the processing in S502 to S505, to each base station 11 indicated by a base station number 403 of the communication information 400. The base station 11 to which the processing in S502 to S505 is executed will be described as a base station 11a.

In S502, based on the communication information 400, the congestion determining unit 260 generates or updates the congestion information 410 that indicates the congestion status of each base station 11. Further, the congestion determining unit 260 determines whether each base station 11 determined to be congested accommodates the radio terminal 100 of the user who has made a contract of the high QoE communication service (S502).

Figure 3:
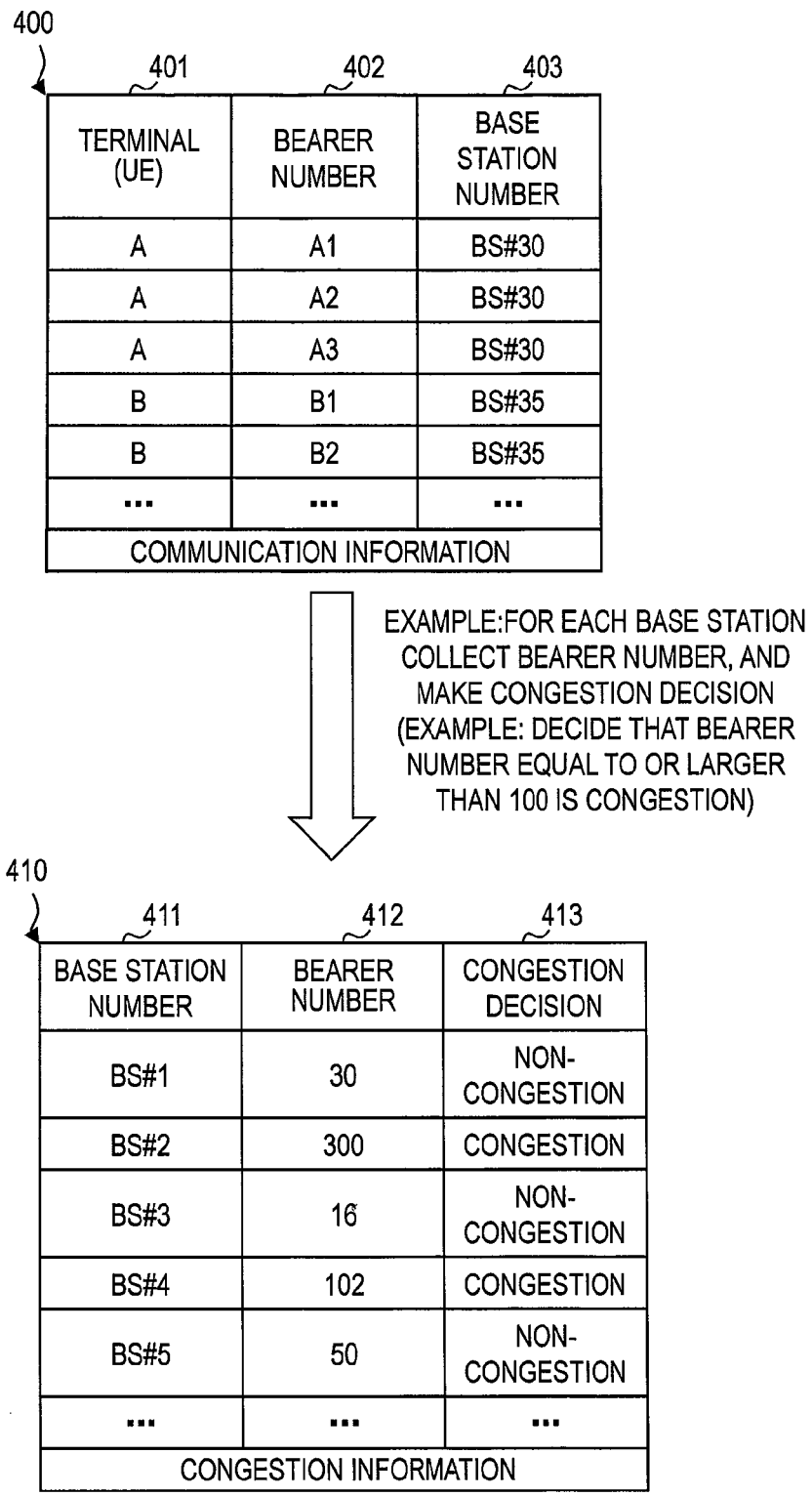
FIG. 3 is an explanatory diagram showing the communication information and the congestion information according to Embodiment 1.

FIG. 3 is an explanatory diagram showing the communication information 400 and the congestion information 410 according to Embodiment 1.

The communication information 400 includes the terminal 401, the bearer number 402, and the base station number 403.

The terminal 401 indicates an identifier of the radio terminal 100. The bearer number 402 indicates an identifier of the bearer that the radio terminal 100 indicated by the terminal 401 accommodates. The base station number 403 indicates an identifier of the base station 11 that accommodates the radio terminal 100.

The congestion information 410 includes a base station number 411, a bearer number 412, and a congestion decision 413.

The base station number 411 indicates an identifier of the base station 11. The bearer number 412 indicates the number of bearers that are accommodated in the base station 11. The congestion decision 413 indicates a decision result obtained by determining a congestion status based on the communication information 400.

The congestion decision 413 shown in FIG. 2 indicates "congestion" when the number indicated by the bearer number 412 is equal to or larger than a predetermined threshold value, and indicates "non-congestion" when the number indicated by the bearer number 412 is smaller than the predetermined threshold value.

The bearer indicated by the bearer number 402 is an active bearer that is utilized when the radio terminal 100 is communicating data for the purpose of providing services from the server 200. More specifically, in the example of FIG. 1, the bearer indicated by the bearer number 402 is a bearer in which the radio link 60, the GTP tunnel 61, and the GTP tunnel 62 are all set.

The processing in S502 will be described in detail. The congestion determining unit 260 calculates the number of entries in the base station 11a that the base station number 403 of the communication information 400 indicates. The congestion determining unit 260 updates, by the calculated number, the bearer number 412 of the entry of the congestion information 410 of the base station number 411 that indicates the base station 11a.

When the value of the bearer number 412 of the base station 11a is equal to or larger than a predetermined threshold value (100 bearers, for example), the congestion determining unit 260 determines that the communications in the base station 11a are in the congestion status, and updates the congestion decision 413 by the identifier that indicates the "congestion".

The congestion determining unit 260 can more accurately determine the congestion status, based on accurate information concerning active communications, by determining the congestion status based on the bearer number accommodated in the base station 11a.

In the case where the congestion determining unit 260 has obtained the information corresponding to the congestion information 410 from the base station 11, the congestion determining unit 260 stores the obtained information into the memory of the control server 26 as the congestion information 410.

In S502, the congestion determining unit 260 may determine the congestion status of communications that the base station 11a accommodates, by using the band in the path of the communication from the base station 11 to the server 200. Specifically, by obtaining the band of the bearers that the base station 11a accommodates, when a total band of the bearers that the base station 11a accommodates exceeds a predetermined threshold value, the congestion determining unit 260 may determine that the communications that the base station 11a accommodates are in the congestion status.

In S502, the congestion determining unit 260 may identify the radio terminal 100 to which the high QoE communication is applied by using the congestion status of communications that pass through the P-GW 21. For example, the congestion determining unit 260 may obtain the utilization rate of the line in the P-GW 21, from the P-GW 21.

Further, based on the obtained information, the congestion determining unit 260 may extract the line in which the utilization rate of the band exceeds 90% of the total band, in the line at the downlink side (the S-GW 22 side) of the P-GW 21, and identify the radio terminal 100 of the user who has made a contract of the high QoE communication service, out of the radio terminals 100 that are accommodated in the extracted line. Then, the congestion determining unit 260 may determine the identified radio terminal 100 as the radio terminal 100 to which the high QoE communication of the proxy device 300 is to be applied.

The congestion determining unit 260 can determine the congestion status more accurately, by determining the congestion status using the utilization rate and the like of the band of the bearer or the band in the P-GW 21.

After determining the congestion status in S502, the congestion determining unit 260 indicates that the congestion decision 413 of the base station 11a is congested, and also determines based on the communication information 400 and the terminal contract information 420 whether the radio terminals 100 accommodated in the base station 11a includes the radio terminal 100 that has made a contract of the high QoE communication service.

FIGS. 4A and 4B are explanatory diagrams showing the terminal contract information 420 that the control server 26 has, and application information 365 that the proxy device 300 has, according to Embodiment 1.

FIG. 4A is an explanatory diagram showing the terminal contract information 420 according to Embodiment 1.

The terminal contract information 420 is the information that indicates the radio terminal 100 to which the high QoE communication is applied, and the information is set in advance by the network operator. The terminal contract information 420 includes at least a user 421 and a high QoE contract 422. Further, the terminal contract information 420 may also include a high QoE upper limit band 423 and an option 424, when necessary.

The user 421 indicates the radio terminal 100. The user 421 indicates an identifier corresponding to the terminal 401 of the communication information 400, and indicates an IP address of the radio terminal 100, for example.

The high QoE contract 422 indicates whether the radio terminal 100 indicated by the user 421 is the radio terminal of the user who has made a contract of the high QoE communication service. When the high QoE contract 422 shown in FIG. 4A indicates "present", the high QoE communication is applied to the radio terminal 100 indicated by the user 421, and when the high QoE contract 422 indicates "absent", the high QoE communication is not applied to the radio terminal 100 indicated by the user 421.

Because the high QoE communication according to the present embodiment is realized by the TCP transmission optimization control, the terminal contract information 420 according to the present embodiment has the high QoE upper limit band 423. The high QoE upper limit band 423 indicates the upper limit that is guaranteed by the TCP transmission optimization control.

When the TCP transmission optimization control according to the present embodiment has been performed, there is a possibility that the communication band of the radio terminal 100 other than the radio terminal 100 of the user who has made a contract of the high QoE communication service is deprived of, and the quality of experience of the radio terminal 100 other than the radio terminal 100 of the user who has made the contract is further lowered. In order to reduce as much as possible the possibility of the influence of the TCP transmission optimization control, in the case of applying the high QoE communication to the communication of the radio terminal 100 of the user who has made a contract of the high QoE communication service, the proxy device 300 performs the TCP transmission optimization control by setting the band indicated by the high QoE upper limit band 423 to the upper limit.

As described above, because the terminal contract information 420 includes the high QoE upper limit band 423, the proxy device 300 can avoid as far as possible further deterioration in the quality of experience of the user who has not made a contract of the high QoE communication service, while avoiding deterioration and improving the quality of experience of the user who has made a contract of the high QoE communication service.

The option 424 indicates a target, a purpose, a content, a condition or the like of the application of the high QoE communication. The option 424 shown in FIG. 4A indicates a purpose, a content, and the like of the communication to which the high QoE communication is applied, among the communications by the radio terminal 100, and indicates application services that the server 200 provides, for example.

Further, as a target to which the high QoE communication is applied, the option 424 may indicate all accesses (a specific URL: Uniform Resource Locator) to a specific service provider (Over The Top (OTT)), or a specific application access (Web browsing, video watching, a game, a mail, a Web application, and the like), instead of all communications of each radio terminal 100, for example.

In S502, when the congestion decision 413 indicates that the base station 11*a* is congested and also when it has been determined that the radio terminal 100 accommodated in the radio station 11*a* is the radio terminal 100 of the user who has made a contract of the high QoE communication service, the congestion determining unit 260 identifies the radio terminal 100 which is accommodated in the base station 11*a* and also to which the high QoE communication is applied, by using the communication information 400, the congestion information 410, and the terminal contract information 420.

The congestion determining unit 260 holds the information concerning the identified radio terminal 100, for the processing in S504 in the next time slice.

The congestion determining unit 260 transmits the information concerning the identified radio terminal 100 to the P-GW 21. Accordingly, the congestion determining unit 260 makes the proxy device 300 apply the TCP transmission optimization control to the communication of the radio terminal 100, accommodated in the base station in the congested state, of the user who has made a contract of the high QoE communication service (S503).

In S503, the information that the congestion determining unit 260 transmits to the P-GW 21 includes at least the identifiers (corresponding to the terminal 401 of the communication information 400, and the user 421 of the terminal contract information 420) that indicate the radio terminal 100 which is accommodated in the base station 11*a* and also to which the high QoE communication is applied. The information that is transmitted to the P-GW 21 includes the high QoE upper limit band 423 or the option 424 of the terminal contract information 420, when necessary.

The P-GW 21 forwards the received packet to the proxy device 300, based on the information received from the control server 26.

In the case where the information that the congestion determining unit 260 transmits to the P-GW 21 includes at least one of the high QoE upper limit band 423 and the option 424, the P-GW 21 forwards the information received from the congestion determining unit 260, to the proxy device 300. The proxy device 300 updates the setting (the application information 365 to be described later) for applying the high QoE communication held by the own, by the information received from the congestion determining unit 260.

FIG. 4B is an explanatory diagram showing the application information 365 held by the proxy device 300 according to Embodiment 1.

The proxy device 300 has the application information 365 in the own memory. The application information 365 indicates the information concerning the high QoE communication that is applied to the radio terminal 100 of the user who has made a contract of the high QoE communication service. The application information 365 may be set in advance by the network operator or the like, and may be updated based on the information transmitted from the control server 36.

The application information 365 includes a user 3651, a high QoE upper limit band 3652, and an option 3653. The user 3651 indicates an identifier of the radio terminal 100, and corresponds to the user 421 of the terminal contract information 420. The high QoE upper limit band 3652 indicates the upper limit band that is guaranteed by the TCP transmission optimization control, and corresponds to the high QoE upper limit band 423 of the terminal contract information 420. The option 3653 indicates a target, a purpose, a content, a condition or the like of the application of the high QoE communication, and corresponds to the option 424 of the terminal contract information 420.

In S502 shown in FIG. 2, in the case where the congestion decision 413 indicates that the base station 11*a* is not congested or where it has been determined that the radio terminals 100 accommodated in the base station 11*a* include no radio terminal 100 of the user who has made a contract of the high QoE communication service, the congestion determining unit 260 executes S504.

In S504, the congestion determining unit 260 determines whether the radio terminals 100 accommodated in the base station 11a include the radio terminal 100 to which the TCP transmission optimization control has been applied, in the last time slice executed by the base station 11a. Specifically, in the last S503 executed by the base station 11a, when the information concerning the radio terminal 100 transmitted to the P-GW 21 has been transmitted as the radio terminal 100 to which the high QoE communication is applied, the congestion determining unit 260 determines that there is the radio terminal 100 to which the TCP transmission optimization control has been applied.

In the last S503, when there is the radio terminal 100 to which the TCP transmission optimization control has been applied, because the congested state in the base station 11a is cancelled at the present time, the congestion determining unit 260 cancels the application of the high QoE communication to the radio terminal 100, accommodated in the base station 11a, to which the TCP transmission optimization control has been applied last time (S505).

Specifically, the congestion determining unit 260 transmits to the P-GW 21, the identifier of the radio terminal 100, accommodated in the base station 11a, to which the TCP transmission optimization control has been applied last time. When the P-GW 21 has received the identifier of the radio terminal 100 from the congestion determining unit 260, in the state that the communication of the radio terminal 100 has been forwarded to the proxy device 300, the P-GW 21 changes the own setting so that the communication of the radio terminal 100 is not forwarded to the proxy device 300.

Accordingly, because the resources of the proxy devices 300 are released, the released resources can be utilized for the radio terminal 100, accommodated in the base station 11 in a separate congestion status, of the user who has made a contract of the high QoE communication service.

In S504, in the last time slice executed to the base station 11a, when there is no radio terminal 100 to which the TCP transmission optimization control has been applied, the processing of the proxy device 300 does not need to be changed, in the communication of the radio terminal 100 accommodated in the base station 11a. Therefore, the congestion determining unit 260 executes the processing of S502 to S505 to other base stations 11.

S502 and S504 correspond to the congestion decision 52. And S503 and S505 correspond to the setting 53.

After the processing corresponding to S502 to S505 have been executed to all base stations 11, the congestion determining unit 260 waits until the next time slice (S506). In the next time slice, the congestion determining unit 260 executes S501 again.

In S505 shown in FIG. 2, by cancelling the high QoE communication, the limited resources of the proxy device 300 can be used for the radio terminal 100 for which the high QoE communication is necessary. Therefore, it is possible to obtain the effect of reducing the lowering of the quality of experience (QoE) in communication, without increasing the introduction cost.

The high QoE upper limit band 423 of the terminal contract information 420 may be the upper limit band (15 Mbps in the example of FIG. 4A of the APN-AMBR (Access Point Name-Aggregate Max Bit Rate) of the allocation band (Non-GBR (Guaranteed Bit Rate)) that is defined by the QCI (Quality Class ID), for example.

The congestion determining unit 260 according to the present embodiment may newly determine the value of the high QoE upper limit band 423 that is transmitted to the P-GW 21, according to the communication status between the radio terminal 100 and the server 200. A detailed example will be described below.

The S/N (Signal/Noise) ratio in each radio terminal 100 of the base station 11 is not constant. Particularly, in the case where the S/N ratio is smaller than a predetermined threshold value, i.e., the S/N ratio is poor, forced increase of the effective throughput will generate a large quantity of packet loss, so that the effective throughput is naturally likely to be lowered.

Therefore, the congestion determining unit 260 according to the present embodiment may determine the upper limit band according to the S/N ratio of the radio terminal 100. For example, the congestion determining unit 260 obtains the S/N ratio of the radio terminal 100 from the base station 11. In S503, as the information concerning the radio terminal 100 to which the high QoE communication is applied, in the case of transmitting the identifier of the radio terminal 100 of which the S/N ratio is smaller than the predetermined threshold value, the congestion determining unit 260 may determine 50% of the value of the high QoE upper limit band 423 of the corresponding radio terminal 100 as the high QoE upper limit band 423 to be transmitted to the P-GW 21.

The proxy device 300 transmits a packet that the radio terminal 100 of the poor S/N ratio transmits and receives, by the transmission band that has 50% of the value of the high QoE upper limit band 423 as the upper limit. Accordingly, the proxy device 300 can realize more optimum effective throughput, by avoiding waste of the band, based on the allocation of the high band to the radio terminal 100 of the poor S/N ratio.

The congestion determining unit 260 may determine the upper limit band, based on the communication status of communications that pass through the P-GW 21. Specifically, based on the utilization rate of the line in the P-GW 21, in the case where the radio terminal 100 to which the high QoE communication is applied has been identified, the congestion determining unit 260 may determine the value obtained by reducing a predetermined ratio portion from the high QoE upper limit band 423 of the entry of the terminal contract information 420 of the identified radio terminal 100, as the value of the high QoE upper limit band 423 to be transmitted to the P-GW 21 by the setting 53.

The congestion determining unit 260 may apply the high QoE communication according to the determined value of the high QoE upper limit band 423, to the communication of the radio terminal 100 identified based on the utilization rate of the line in the P-GW 21. Consequently, following the communication status in the P-GW 21, the transmission band of the communication to which the proxy device 300 applies the high QoE communication can be limited by the upper limit value, and more optimum effective throughput can be realized.

Figure 5:
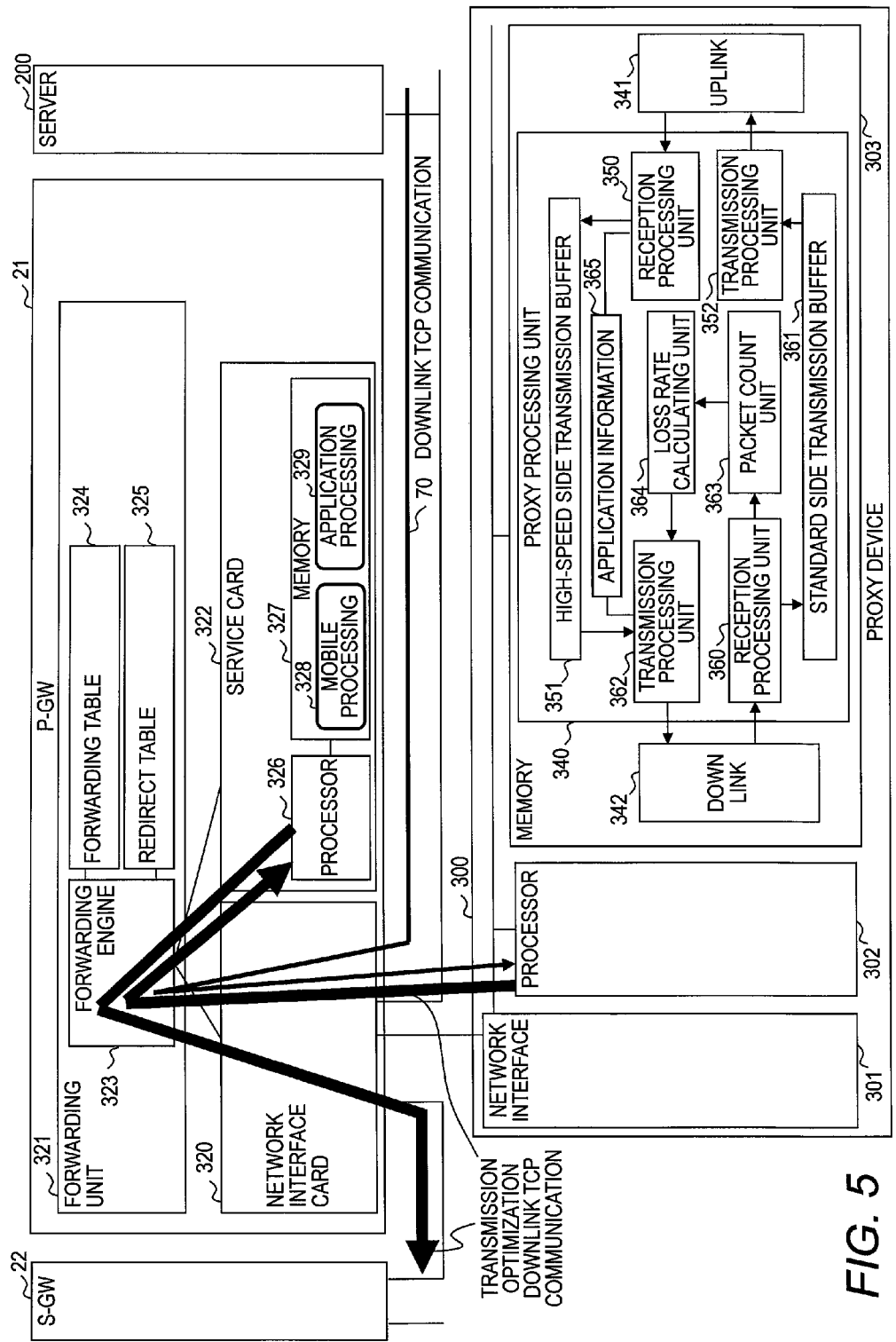
FIG. 5 is a block diagram showing physical configurations of the P-GW and the proxy device according to Embodiment 1.

FIG. 5 is a block diagram showing physical configurations of the P-GW 21 and the proxy device 300 according to Embodiment 1.

The P-GW 21 and the proxy device 300 shown in FIG. 5 are in the out-of-line configuration by the One Arm connection.

The P-GW 21 is a computer for forwarding the received packet, and has a network interface card 320, a forwarding unit 321, and a service card 322, for example. The network interface card 320 is the interface for connecting to the external network. The forwarding unit 321 determines a transmission destination of the received packet. The service card 322 performs predetermined information processing.

The forwarding unit 321 has a forwarding engine 323, a forwarding table 324, and a redirect table 325. The forwarding table 324 has information for determining a transmission destination from a destination IP address that is included in the received packet.

The redirect table 325 indicates information for determining whether the received packet is to be redirected. The redirect table 325 indicates a value of at least one field that is included in the header of the packet to be redirected, for example. A redirect destination according to the present embodiment is the proxy device 300.

The forwarding engine 323 determines a transmission destination or a direct destination of the received packet, by referring to the information included in the received packet, and the content of the forwarding table 324 and the redirect table 325. When the information included in the received packet coincides with both the forwarding table 324 and the redirect table 325, the forwarding engine 323 according to the present embodiment prioritizes the redirect destination of the redirect table 325, and redirects the received packet to the proxy device 300.

The redirect table 325 according to the present embodiment is used to redirect to the proxy device 300, the communication destined to the radio terminal 100 to which the high QoE communication according to the present embodiment is applied.

When a part of the received packet header coincides with a condition described in the redirect table 325, the forwarding engine 323 redirects the received packet to the proxy device 300.

The service card 322 includes a processor 326 and a memory 327. The processor 326 develops on the memory 327 in advance, a mobile processing unit 328 and an application processing unit 329 that should execute in the P-GW 21. The processor 326 executes the mobile processing unit 328 to the received packet.

The mobile processing unit 328 and the application processing unit 329 may be installed by a program, or may be installed by a physical device.

When the P-GW 21 has received from the control server 26, the information concerning the radio terminal 100 by the setting 53, the application processing unit 329 writes the information into the redirect table 325, by using a part of the received packet header of the radio terminal 100 as a redirect condition, and by setting the transmission destination as the proxy device 300. When the received information includes the information corresponding to the high QoE upper limit band 423 and the option 424, the application processing unit 329 forwards the received information to the proxy device 300.

The proxy device 300 is a computer that includes a network interface 301, a processor 302, and a memory 303. In the memory 303, a proxy processing unit 340 for realizing the TCP transmission optimization control is developed.

The proxy processing unit 340 may be installed by at least one program, or may be installed by at least one physical device.

The proxy processing unit 340 has a downlink interface 342, an uplink interface 341, a high-speed side transmission buffer 351, a reception processing unit 350, a standard side transmission buffer 361, a reception processing unit 360, a transmission processing unit 352, a packet count unit 363, a loss rate calculating unit 364, a transmission processing unit 362, and application information 365.

The uplink interface 341 is the interface for the proxy device 300 to receive the downlink TCP communication 70, and for the proxy device 300 to transmit the uplink TCP communication 71. The downlink interface 342 is the interface for the proxy device 300 to receive the uplink TCP communication 71, and for the proxy device 300 to transmit the downlink TCP communication 70.

The high-speed side transmission buffer 351 and the standard side transmission buffer 361 are the buffers that temporarily store the packet. The reception processing unit 350 receives the packet from the uplink interface 341, and loads the received packet into the high-speed side transmission buffer 351. The reception processing unit 360 receives the packet from the downlink interface 342, and loads the received packet into the standard side transmission buffer 361.

The transmission processing unit 352 transmits the packets held in the standard side transmission buffer 361, based on a standard TCP congestion control method. The packet count unit 363 counts the packets received by the transmission processing unit 352.

Specifically, the packet count unit 363 counts the number snd of the packets that the proxy device 300 has transmitted, the number ack of the packets of the ACK that the proxy device 300 has received, the number rts of the packets that the proxy device 300 has been requested to retransmit, and the number sack.dup of the packets of the SACK in the case where the value of the SACK of the SACK packets that the proxy device 300 has received is the same as the value of the SACK received immediately before.

The loss rate calculating unit 364 calculates the packet loss rate in the downlink communication, by using Equation 1 and Equation 2, from snd, ack, rts, and sack.dup. Accordingly, the loss rate calculating unit 364 can calculate the packet loss rate by using the TCP.

The loss rate calculating unit 364 notifies the calculated packet loss rate to the transmission processing unit 362. The transmission processing unit 362 transmits the packets held in the high-speed side transmission buffer 351, following the calculated packet loss rate.

There will be described below the processing of the P-GW 21 and the proxy device 300 in the case where it has been determined that the downlink TCP communication 70-2 is the communication to the radio terminal 100-2 of the user who has made a contract of the high QoE communication service and that the communications in the base station 11a in which the radio terminal 100-2 is accommodated is in the congested state.

In this case, in the redirect table 325, there is stored the identifier that indicates the radio terminal 100-2, by the setting 53 of the control server 26. In the case where the P-GW 21 has received the downlink TCP communication 70-2 from the server 200, the forwarding engine 323 of the forwarding unit 321 receives the downlink TCP communication 70-2, via the network interface card 320.

Because the packet destination of the downlink TCP communication 70-2 coincides with the identifier of the radio terminal 100-2 that is indicated by the redirect table 325, the forwarding engine 323 prioritizes a result of a search by the redirect table 325, and redirects the packet of the downlink TCP communication 70-2 to the proxy device 300.

In the case where the congested state in the base station 11a has been cancelled, the application processing unit 329 invalidates the entry that indicates the radio terminal 100-2 of the redirect table 325, by the setting 53 by the control server 26. For example, the application processing unit 329 invalidates the entry, by deleting the entry that indicates the radio terminal 100-2. As a result of the invalidation of the entry, the redirect processing to the proxy device 300 of the downlink TCP communication 70-2 stops, and consequently, the application of the high QoE communication to the downlink TCP communication 70-2 is cancelled.

When the packet of the downlink TCP communication 70-2 has been received, the network interface 301 of the proxy device 300 stores the packet into the memory 303. When the packet has been stored in the memory 303, the uplink interface 341 inputs the packet of the downlink TCP communication 70-2 to the reception processing unit 350 via the memory space of the uplink interface 341.

After the reception processing unit 350 has loaded the input packet in the high-speed side transmission buffer 351, the transmission processing unit 362 transmits the packet, by using as the upper limit the transmission band which has been calculated based on the packet loss rate. Specifically, the transmission processing unit 362 calculates a transmission band obtained by reducing the packet loss rate portion notified from the loss rate calculating unit 364, from the transmission band of the received packet.

Then, the transmission processing unit 362 stores the packet loaded in the high-speed side transmission buffer 351, into the memory space of the downlink interface 342, by using the transmission band up to the calculated transmission band as the upper limit. Accordingly, the transmission processing unit 362 applies the high QoE communication to the downlink TCP communication 70-2, and further, relays the packet of the downlink TCP communication 70-2.

In the case where the proxy processing unit 340 has the application information 365 and further the application information 365 includes the high QoE upper limit band 3652, the transmission processing unit 362 transmits the packet, by using the band indicated by the high QoE upper limit band 3652 of the radio terminal 100-2 as the upper limit of the transmission band.

The downlink interface 342 transmits the stored packet of the downlink TCP communication 70-2 to the P-GW 21 via the network interface 301 again. The network interface card 320 of the P-GW 21 transmits the packet of the downlink TCP communication 70-2 transmitted from the proxy device 300, to the forwarding engine 323 of the forwarding unit 321. In this case, the high QoE communication is applied to the downlink TCP communication 70-2 that has been transmitted to the P-GW 21, and the TCP transmission optimization control according to the present embodiment is executed.

In the case where the proxy processing unit 340 has the application information 365 and further the application information 365 includes the option 3653, the reception processing unit 350 checks the content of the inputted packet, in order to determine whether the input packet is the target to which the high QoE communication is to be applied. For example, in the case where the option 3653 indicates the service provider to which the high QoE communication is to be applied, the reception processing unit 350 checks whether the transmission source IP address that is recorded in a layer 3 of the inputted packet corresponds to the server 200 of the service provider indicated by the option 3653.

In the case where the option 3653 indicates the application, the reception processing unit 350 checks whether the port number recorded in a layer 4 of the inputted packet, or the session ID or the like peculiar to the application recorded in the payload of a layer 7 corresponds to the application indicated by the option 3653.

When the port number or the session ID or the like corresponds to the application indicated by the option 3653, the reception processing unit 350 adds a flag that means the application of the high QoE communication, to the inputted packet (or sets the added flag to valid), and loads the packet which is added with the flag, into the high-speed side transmission buffer 351.

In the case where the packet added with the flag has been taken out from the high-speed side transmission buffer 351 (or in the case where the flag is valid), the transmission processing unit 362 transmits the packet by the transmission band based on the packet loss rate according to the present embodiment. In the case where the flag has not been added to the packet (or in the case where the flag is invalid), the transmission processing unit 362 transmits the packet based on a conventional TCP congestion control.

In the case where the packet has been received from the proxy device 300, the forwarding engine 323 refers to the forwarding table 324. In this case, because the packet has been transmitted from the proxy device 300, the forwarding engine 323 determines a forwarding destination by prioritizing the content of the forwarding table 324. Then, the forwarding engine 323 inputs the packet of the downlink TCP communication 70-2 into the mobile processing unit 328 of the service card 322.

The mobile processing unit 328 performs predetermined mobile processing to the packet of the downlink TCP communication 70-2, by utilizing the processor 326, and outputs the packet to the forwarding engine 323. Thereafter, the forwarding engine 323 forwards the mobile-processed packet to the S-GW 22 via the network interface card 320.

Accordingly, the high QoE communication is applied to the downlink TCP communication 70-2, and the downlink TCP communication 70-2 reaches the radio terminal 100 of the user. The above is the processing example of the downlink communication in the out-of-line configuration by the One Arm connection of the proxy device 300 to the P-GW 21.

A configuration example of the proxy device 300 in the communication system according to Embodiment 1 will be described below.

The P-GW 21 may include the proxy device 300 by the out-of-line configuration, inside the P-GW 21. In this case, the proxy processing unit 340, the uplink interface 341, and the downlink interface 342 may be developed on the memory 327 of the service card 322. The forwarding engine 323 may redirect the packet that the radio terminal 100 to which the high QoE communication is applied communicates, to the program of the proxy processing unit 340 and the like that are developed on the memory 327 of the service card 322.

Other operations are the same as those of the out-of-line configuration by the One Arm connection. To simplify the description, the service card 322 is shown by only one in FIG. 5. However, the P-GW 21 may include a plurality of service cards 322 by usage such as the mobile processing unit 328 and the proxy processing unit 340.

By installing the proxy processing unit 340 in the P-GW 21, the cost of additionally introducing the proxy device 300 can be reduced.

As a connection configuration of the proxy device 300 to the P-GW 21, in addition to the above out-of-line configuration, there is an inline configuration of installing the proxy device 300 on the communication path between the base station 11 and the server 200.

Figure 6:
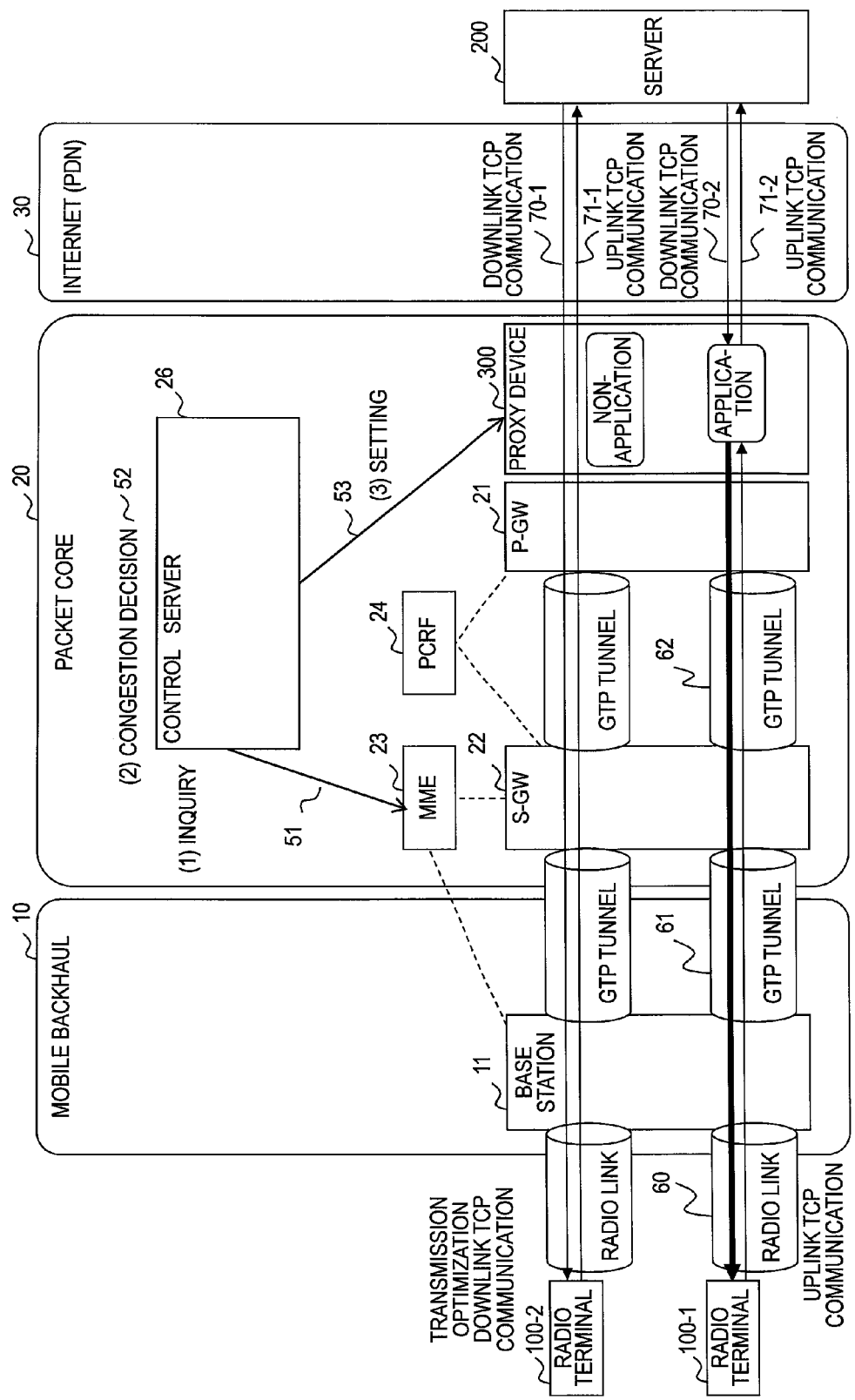
FIG. 6 is a block diagram showing the P-GW and the proxy device 300 in the inline configuration according to Embodiment 1.

FIG. 6 is a block diagram showing the P-GW 21 and the proxy device 300 in the inline configuration according to Embodiment 1.

In the case where the P-GW 21 and the proxy device 300 are in the inline configuration, the P-GW 21 does not redirect packets to the proxy device 300, and transmits all packets to the proxy device 300. Therefore, the P-GW 21 does not need to have the identifier of the radio terminal 100 to be redirected to the proxy device 300, in the redirect table 325. Therefore, the control server 26 performs the setting 53 only to the proxy device 300.

The proxy device 300 in the inline configuration has an application list (not shown) which indicates the radio terminal 100 to which the high QoE communication is applied. In the case where the proxy device 300 has received the information concerning the radio terminal 100 from the control server 26, the proxy processing unit 340 updates the application list, based on the received information.

In the case where the packet of the downlink TCP communication 70 has been inputted, the reception processing unit 350 refers to the application list. In the case where the transmission destination of the inputted packet is the radio terminal 100 indicated by the application list, the reception processing unit 350 adds the flag which indicates the application of the high QoE communication, to the inputted packet. The reception processing unit 350 stores the inputted packet into the high-speed side transmission buffer 351. The transmission processing unit 362 applies the high QoE communication to the packet, following the flag which is added to the packet.

Figure 7:
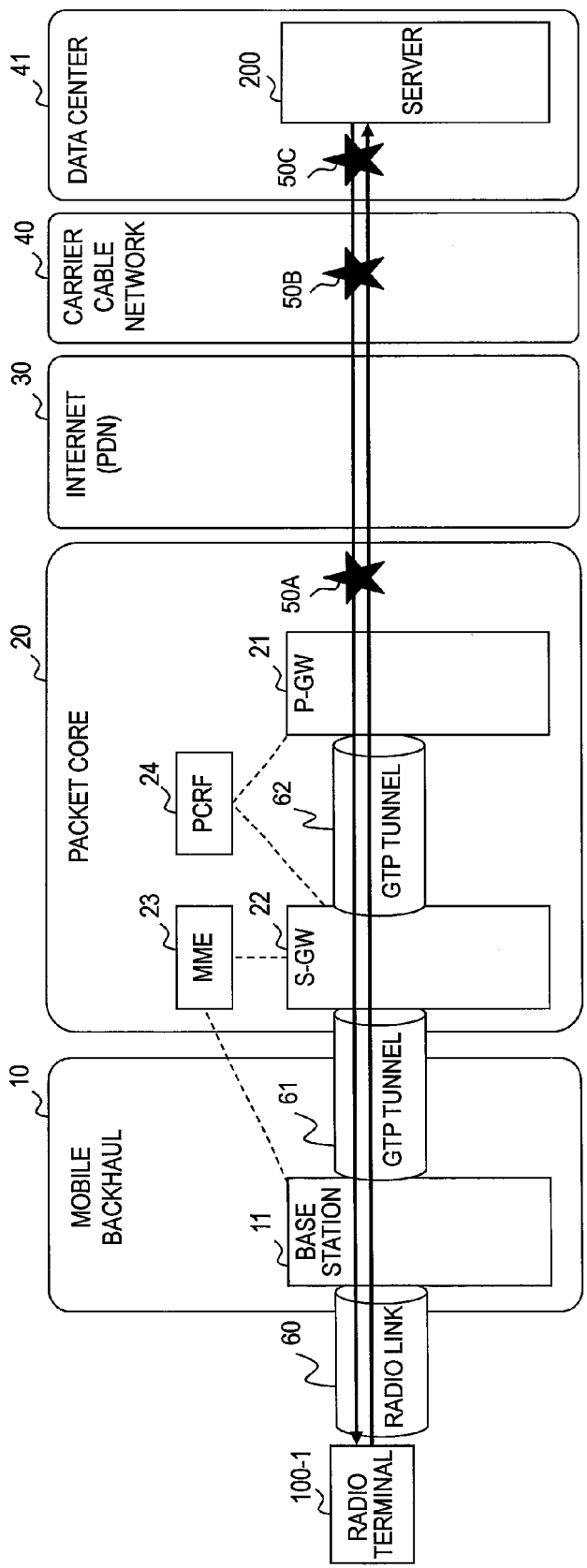
FIG. 7 is an explanatory diagram showing the installation position of the proxy device in the inline configuration according to Embodiment 1.

FIG. 7 is an explanatory diagram showing the installation position of the proxy device 300 in the inline configuration according to Embodiment 1.

The server 200 shown in FIG. 7 is included in a datacenter 41. The server 200 shown in FIG. 7 receives the packet transmitted from the base station 11, via the mobile backhaul 10, the packet core 20, the internet 30, a carrier cable network 40, and the datacenter 41.

A position 50A, a position 50B, and a position 50C shown in FIG. 7 are main examples of positions at which the proxy device 300 is installed. In order for the network operators to freely increase or decrease the installation of the proxy device 300 and perform the maintenance, and also in order not to limit the connected server 200 of the service provider, the proxy device 300 should be installed at the position 50A. On the other hand, from the viewpoint of the application mode or the service mode, the proxy device 300 may be installed at the position 50B or the position 50C.

The position 50A indicates the entrance and exit of the packet core 20 to the internet 30. In the case where the proxy device 300 is installed at the position 50A, the proxy device 300 cannot cancel, by the TCP transmission optimization control, in the downlink TCP communication 70, the deterioration in the quality of experience which is generated depending on the distance over which the communication passes through the internet 30.

However, in the case where the proxy device 300 is installed at the position 50A, the proxy device 300 can minimize the influence of the packet loss which is the main factor that deteriorates the TCP/IP communication in the radio network, and also can improve the user quality of experience, without limiting a service provider.

In the case where the proxy device 300 is installed at the position 50A, the proxy device 300 can solve, in the downlink TCP communication 70, all the quality of experience generated following the distance over which the communication passes through the internet 30, by the TCP transmission optimization control.

The position 50B indicates the carrier cable network 40 near the server 200 of the service provider. In many cases, the manager of the carrier cable network 40 is different from the manager of the datacenter 41.

In the case where the proxy device 300 has been installed at the position 50B, the proxy device 300 can realize by the TCP transmission optimization control in the downlink communication to the radio terminal 100, the cancellation of the deterioration in the quality of experience generated depending on the distance over which the communication passes through the internet 30, and the reduction in the influence of the packet loss which is the main factor that deteriorates the TCP/IP communication in the radio network. Consequently, the proxy device 300 can improve the user quality of experience.

However, in many cases, because there exist a large number of datacenters 41 each including the server 200, the network operator needs to install the proxy device 300 in each carrier cable network 40 near each datacenter 41. Therefore, the introduction cost of installing the proxy device 300 increases.

In the case of installing the proxy device 300 only in the carrier cable network 40 near some of the datacenters 41, there occurs the server 200 that does not communicate with the base station 11 not via the proxy device 300, out of the plurality of servers 200. Because the high QoE communication according to the present embodiment is not applied to the communication that is not via the proxy device 300, service providers to whom the high QoE communication is applied are limited.

The position 50C is located at the entrance and exit to the carrier cable network 40, of the datacenter 41 equipped with the server 200 of the service provider. In the case where the proxy device 300 is installed at the position 50C, the proxy device 300 can realize by the TCP transmission optimization control in the downlink communication to the radio terminal 100, the cancellation of the deterioration in the quality of experience generated depending on the distance over which the communication passes through the internet 30, and the reduction in the influence of the packet loss which is the main factor that deteriorates the TCP/IP communication in the radio network. Consequently, the proxy device 300 can improve the user quality of experience.

However, in many cases, because there exist a large number of datacenters 41 each including the server 200, the network operator needs to install the proxy device 300 in each of the plurality of datacenters 41. Therefore, the introduction cost of installing the proxy device 300 increases. Further, because the proxy device 300 that is installed at the position 50C applies the high QoE communication only to the communication of the server 200 of the service provider that is equipped in the installed datacenter 41, the proxy device 300 cannot apply the high QoE communication to communications of all servers 200.

In the above embodiment, there has been mainly described the example that the proxy device 300 improves the effective throughput in the downlink direction by applying the high QoE communication to the downlink TCP communication 70. However, the proxy device 300 according to the present embodiment may improve the effective throughput in the uplink direction by applying the high QoE communication to the uplink TCP communication 71.

In order to apply the high QoE communication to the uplink TCP communication 71, the proxy device 300 may have a proxy processing unit that has the function of the proxy processing unit 340 applied to the uplink communication. In the case where the P-GW 21 and the proxy device 300 are in the out-of-line configuration, the forwarding engine 323 of the P-GW 21 may forward to the proxy device 300, the packet that includes the radio terminal 100, indicated by the redirect table 325, as the transmission source.

In the case of applying the high QoE communication to the uplink TCP communication 71, the proxy device 300 that is installed closer to the base station 11 can realize the cancellation of the deterioration in the quality of experience that is generated due to the passing through each network. For example, when the proxy device 300 is installed near the S-GW 22 which is nearer the base station 11 than the P-GW 21, higher effect can be obtained. However, in general, because a larger number of the S-GW 22 than the P-GW 21 are installed, there is a concern that the installation number of the proxy devices 300 will increase. Therefore, it is preferable that the proxy device 300 is installed near the S-GW 22 in the region that is in charge of the transmission and reception in the urban areas in which congestion is particularly anticipated.

According to Embodiment 1, the proxy device 300 applies the TCP transmission optimization control to the users who communicate via the base station 11 that is in the congested state. Because the TCP transmission optimization control is not applied to all communications, it becomes possible to reduce the reduction in the quality of experience (QoE) in communication, without increasing the introduction number, that is, the introduction cost, more than is necessary.

Because the proxy device 300 relays the packet by the transmission band from which the packet loss rate portion has been reduced, the effective throughput can be improved without reducing the transmission band more than is necessary.

Embodiment 2

In a communication system according to Embodiment 2, the high QoE communication is applied to the communication of a user who has made a contract, like in Embodiment 1, and further the high QoE communication is applied to the communication of a predetermined service provider, unlike in Embodiment 1.

According to the communication system of Embodiment 2, the network operator provides the high QoE communication so that the network operator can obtain a charge income from the service provider as well as obtaining a charge income from the users. The service provider can provide a comfortable access to the radio terminal 100, by applying the high QoE communication service to the communication to the service (a site, for example) that the service provider provides to the radio terminal 100. As a result, the service provider can differentiate the quality of the provided service from the quality of the service provided by other service providers, and can make many users utilize the service provided by the service provider.

A system configuration diagram of the communication system according to Embodiment 2 is the same as that shown in FIG. 1. However, the control server 26 according to Embodiment 2 is different from the control server 26 according to Embodiment 1, in that the control server 26 according to Embodiment 2 has the service provider contract information 430. Further, Embodiment 2 is different from Embodiment 1 in that the control server 26 according to Embodiment 2 executes the inquiry 51, the congestion decision 52, and the setting 53, by the processing indicated in FIG. 9, instead of the processing shown in FIG. 2.

Although the proxy device 300 and the P-GW 21 described below are in the One Arm connection and also in the out-of-line configuration shown in FIG. 1, the proxy device 300 and the P-GW 21 according to Embodiment 2 may be in the inline configuration shown in FIG. 6. The proxy device 300 according to Embodiment 2 may be installed at any one of the position 50A, the position 50B, and the position 50C shown in FIG. 7.

FIG. 8 is an explanatory diagram showing the service provider contract information 430 according to Embodiment 2.

The service provider contract information 430 indicates services that apply the high QoE communication to the communication, and indicates the user who has made in advance a contract of the high QoE communication. The service provider contract information 430 is set in advance by the network operator.

The service provider contract information 430 includes at least a service provider 431, and a network identifier 432, and includes a high QoE upper limit band 433, and an option 434, when necessary.

The service provider 431 indicates the identifier of the service provider who uses the server 200, and indicates the service to which the high QoE communication is applied.

The network identifier 432 indicates the identifier of the service that can be identified in the network. Specifically, the network identifier 432 indicates the server 200, or the URL or the IP address of the service that the server 200 provides.

In Embodiment 2, because the high QoE communication service is also realized by the TCP transmission optimization control, the service provider contract information 430 may include the high QoE upper limit band 433. The high QoE upper limit band 433 is the upper limit band that is guaranteed per the communication (one bearer, for example) to one radio terminal 100 in the TCP transmission optimization control.

The option 434 indicates a target, a condition, and the like to which the high QoE communication is applied. For example, the option 434 may include the identifier that indicates the application access (Web browsing, video watching, a game, a mail, a Web application, and the like), for example. Accordingly, the proxy device 300 according to Embodiment 2 may apply the high QoE communication only to the communication relating to the application access that is indicated in the option 434.

Figure 9:
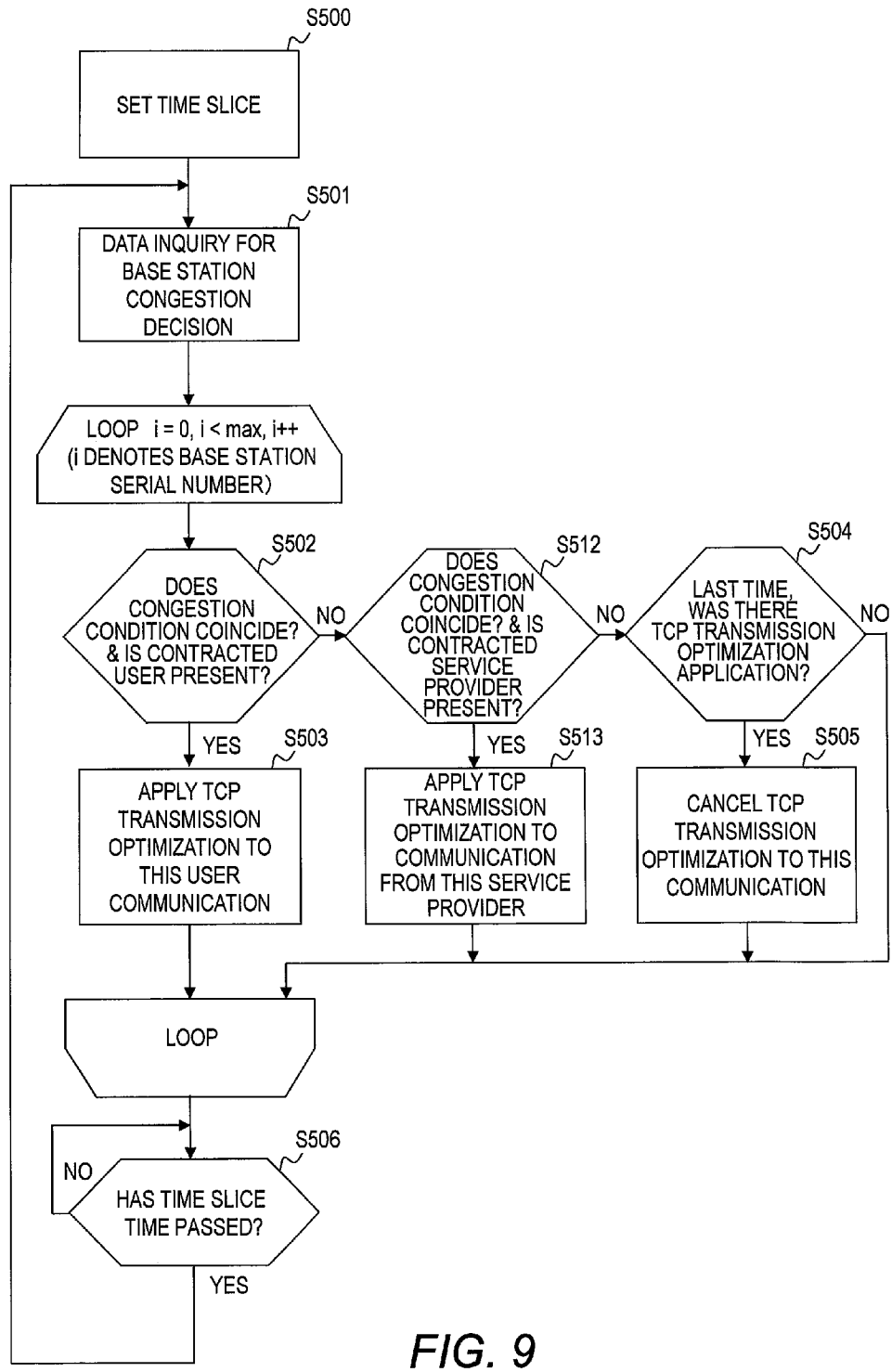
FIG. 9 is a flowchart showing application processing and cancellation processing of the high QoE communication according to Embodiment 2.

FIG. 9 is a flowchart showing application processing and cancellation processing of the high QoE communication according to Embodiment 2.

The processing in S500 to S503 shown in FIG. 9 is the same as the processing in S500 to S503 shown in FIG. 2.

Differences of the flowchart shown in FIG. 9 from the flowchart shown in FIG. 2 will be described below. The congestion determining unit 260 executes S512 when in S502, the congestion decision 413 indicates that the base station 11a is not congested or the radio terminals 100 that are accommodated in the base station 11a do not include any radio terminal 100 that has made a contract of the application of the high QoE communication.

In S512, the congestion determining unit 260 determines whether the congestion decision 413 of the base station 11a indicates congestion, and also whether the entry is stored in the service provider contract information 430. In S512, in the case where the congestion decision 413 of the base station 11a indicates congestion, and also where the entry is stored in the service provider contract information 430, the congestion determining unit 260 transmits to the P-GW 21 the information concerning the radio terminal 100 including the service provider contract information 430, and the identifiers of all radio terminals 100 which are accommodated in the base station 11a (S513).

Based on S513, the congestion determining unit 260 can apply the high QoE communication according to Embodiment 2, to the communication of the radio terminal 100 that is accommodated in the base station 11*a* in the congested state, the communication being for providing the service of the service provider indicated by the service provider contract information 430.

The application processing unit 329 of the P-GW 21 updates the redirect table 325, based on the information concerning the radio terminal 100 received from the control server 26. The redirect table 325, like in Embodiment 1, indicates the identifier of the radio terminal 100 to which the high QoE communication is applied. The forwarding engine 323 redirects the information concerning the radio terminal 100 indicated by the redirect table 325, to the proxy processing unit 340 of the proxy device 300.

The application processing unit 329 of the P-GW 21 forwards to the proxy device 300 the information (hereinafter, simply referred to as service provider contract information) corresponding to the service provider contract information 430, out of the received information concerning the radio terminal 100. The proxy processing unit 340 holds the service provider contract information.

In the case where the reception processing unit 350 of the proxy device 300 has received the packet, and when the received packet indicates the network identifier 432 of the service provider contract information, the reception processing unit 350 adds to the packet the flag that indicates the application of the high QoE communication, and stores the packet into the high-speed side transmission buffer 351. The transmission processing unit 362 applies the high QoE communication to the packet, following the flag added to the packet.

In S512, in the case where the congestion decision 413 of the base station 11*a* indicates non-congestion or where the entry is not stored in the service provider contract information 430, the congestion determining unit 260 executes S504. The processing in S504 to S506 in Embodiment 2 are the same as the processing in S504 to S506 in Embodiment 1.

The network operator may set the value of the high QoE upper limit band 423 of the terminal contract information 420 to be about the same as the value of the high QoE upper limit band 433 of the service provider contract information 430. By expecting the increase in the charge income from the users, the network operator may set the high QoE upper limit band 423 of the terminal contract information 420 for the users to be larger than the high QoE upper limit band 433 of the service provider contract information 430. The terminal contract information 420 shown in FIG. 4A and the service provider contract information 430 shown in FIG. 8 are the examples that the high QoE upper limit band 423 is set larger than the high QoE upper limit band 433.

The terminal contract information 420 shown in FIG. 4A indicates the user A and the user C, as the users who have made a contract of the high QoE communication service. The user A has made a contract of the high QoE communication service of which the upper limit band is 15 Mbps, in all communications. The user C has made a contract of the high QoE communication service of which the upper limit band is 15 Mbps, in only the access to the service provider 2.

On the other hand, the service provider contract information 430 shown in FIG. 8 indicates that a service provider 1 has made a contract of the high QoE communication service of which the upper limit band per one user is 10 Mbps, in all accesses to the own site, and that a service provider 2 has made a contract of the high QoE communication service of which the upper limit band per one user is 5 Mbps, in all accesses to the own site.

At this time, in the case where each radio terminal 100 of each of the user A, the user B, and the user C is accommodated in the base station 11 which is in the congested state, and also where each radio terminal 100 has accessed the site of the service provider 1, because the user A has made a contract of the high QoE communication service to all accesses, the high QoE communication service in the upper limit band 15 Mbps is applied to the communication of the user A, following the terminal contract information 420.

On the other hand, the user B has not made a contract of the high QoE communication service, and the user C has made a contract of the high QoE communication service but has not made a contract of the access to the site of the service provider 1. Therefore, in the case of Embodiment 1, the high QoE communication service is not applied to the access of the user C and the user B to the site of the service provider 1. However, in the case where Embodiment 2 is used, because the service provider 1 has made a contract of the high QoE communication service, the high QoE communication service in the upper limit band 10 Mbps is also applied to the communications of the radio terminals 100 of the user B and the user C to the site of the service provider 1.

According to Embodiment 2, the proxy device 300 applies the TCP transmission optimization control to the communication of the radio terminal 100 which is accommodated in the base station 11 in the congested state and which has made the high QoE communication service, or the communication of the server 200 which is accommodated in the base station 11 in the congested state and which has made the high QoE communication service. Therefore, without increasing the introduction number or the introduction cost of the communication optimization proxy devices, reduction in the quality of experience (QoE) in communication of a specific service can be reduced, following the request of the service providers.

Further, by using the high QoE upper limit band 423 of the service provider contract information 430, the proxy device 300 can avoid the state of reducing the effective throughput in the case where the communication to which the high QoE communication is applied has become excessive.

The terminal contract information 420 and the service provider contract information 430 have been generated based contracts between the user and the network operator, and between the service provider and the network operator. However, the terminal contract information 420 and the service provider contract information 430 may be generated by any method that limits the radio terminal 100 or the service which becomes the target of the TCP transmission optimization control according to the present embodiment, without limiting to a specific contract.

Although the TCP has been used in the control of the proxy device 300 according to the present embodiment, any protocol may be used so far as the protocol acknowledges that the data has reached the reception side.

The present invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

As representative communication systems from the viewpoint of the present invention other than what is described in claims, there are the following communication systems.

(1) A communication system in which when terminal information includes a target that controls communication, a control device sets in a proxy device a target that controls communication of a identified terminal, and the proxy device extracts a communication that indicates the set target to be controlled from the communication of the identified terminal, and relays the extracted communication of a transmission band from which a calculated loss rate portion has been reduced.

(2) The communication system according to (1), wherein the target that controls the communication is a URL, or an IP address that indicates an access destination site, or a kind of an application.

What is claimed is:

1. A communication system configured to forward data to be transmitted and received by a terminal, the communication system comprising:
   a base station configured to communicate with the terminal by radio transmission;
   a server configured to provide services to the terminal;
   a proxy device configured to control communications between the base station and the server; and
   a control device configured to obtain information for determining whether communications that the base station accommodates are congested,
   wherein the control device is configured to
   determine whether the communications that the base station accommodates are congested, based on the obtained information, and
   identify a terminal that is accommodated in the base station in which it is determined that the communications are congested, as a terminal of which communications the proxy device is to control, and
   wherein the proxy device is configured to
   control communications between the base station and the server, by using a protocol that acknowledges that the data has reached a reception side,
   calculate a loss rate at which communications by the identified terminal are to be discarded, by utilizing acknowledgement packets which are used by the protocol,
   relay a communication of the identified terminal, by a transmission band which has been reduced by the calculated loss rate portion,
   obtain, by using the protocol, snd as the number of transmitted packets, ack as the number of acknowledgement packets that indicate that the transmitted packets has reached the reception side, rts as the number of packets of which retransmission has been requested, and sack.dup as the number of selective response packets when a value held by the acknowledgement packets is the same as a value held by selective response packets received immediately before, in the selective response packets that follow the acknowledgement packet and also that indicates a start end and a terminal end of a discontinuous portion of packets at the reception side, and
   calculate rts/snd as the loss rate when snd >ack+rts, and
   calculate 1−(ack−sack.dup)/snd as the loss rate when snd <=ack+rts.

2. The communication system according to claim 1, wherein the control device is configured to
   obtain information of bearers in a path, as information for determining whether the communications that the base station accommodates are congested,
   calculate the number of bearers that the base station accommodates, based on the obtained information of the bearers, and
   determine that the communications that the base station accommodates are congested, when the calculated number of the bearers exceeds a predetermined threshold value.

3. The communication system according to claim 1, wherein
   the control device is configured to
   obtain a total band that the base station uses in the path, as information for determining whether the communications that the base station accommodates are congested, and
   determine that the communications that the base station accommodates are congested, when the obtained band exceeds a predetermined threshold value.

4. The communication system according to claim 1, wherein
   the control device is configured to
   hold terminal information that indicates a terminal of which communications are controlled by the proxy device, and
   identify the terminal of which communications the proxy device controls, based on the obtained information and the terminal information, and
   when the terminal information includes an upper limit of the transmission band,
   the control device is configured to set an identifier that indicates the identified terminal, and an upper limit value of the transmission band of the identified terminal, into the proxy device, and
   when a transmission band from which the calculated loss rate portion has been reduced exceeds the upper limit value that the control device sets, the proxy device is configured to relay a communication of the identified terminal, by the upper limit value that the control device sets.

5. The communication system according to claim 4, wherein
   the control device is configured to
   obtain an S/N ratio of communications of the terminal, and
   when the S/N ratio of the identified terminal is lower than a predetermined threshold value and also when the terminal information includes the upper limit of the transmission band, the control device is configured to determine a value obtained by reducing the upper limit of the identified terminal included in the terminal information by a predetermined rate, as the upper limit value to be set in the proxy device.

6. The communication system according to claim 1, wherein
the control device is configured to
hold service information that indicates services of which communications are controlled by the proxy device, and
set an identifier that indicates the identified terminal, and the service information, into the proxy device, and
the proxy device is configured to
extract a communication of the service that the service information indicates, out of communications by the identified terminal, and
relay the extracted communication, by the transmission band from which the calculated loss rate portion has been reduced.

7. The communication system according to claim 6, wherein
the service information comprises an upper limit value of the transmission band, and
when a transmission band from which the calculated loss rate portion has been reduced exceeds the upper limit value that the service information indicates, the proxy device is configured to relay the extracted communication, by the upper limit value that the service information indicates.

8. The communication system according to claim 1, wherein
the communication system includes a gateway that is installed between the base station and the server,
the proxy device is connected to the gateway via a network interface, and
the gateway is configured to
receive an identifier that indicates the identified terminal, from the control device, and
forward a communication of the identified terminal to the proxy device, based on the received identifier.

9. The communication system according to claim 1, wherein
the communication system includes a gateway that is installed between the base station and the server,
the proxy device is provided in the gateway, and
the gateway is configured to
receive an identifier that indicates the identified terminal, from the control device, and
forward a communication of the identified terminal to the proxy device, based on the received identifier.

10. The communication system according to claim 1, wherein
the communication system includes a public data network that connects the base station and the server to each other, and a gateway that is installed between the public data network and the base station, and
the proxy device is installed between the gateway and the public data network.

11. The communication system according to claim 1, wherein
the communication system includes a public data network that connects the base station and the server to each other, and a datacenter in which the server is installed, and
the proxy device is installed between the public data network and the datacenter, or in the datacenter.

12. A control method of a communication system including a base station that communicates with the terminal by radio transmission, a server that provides services to the terminal, a proxy device that controls communications between the base station and the server and a control device that obtains information for determining whether communications that the base station accommodates are congested, the method comprising:
determining, by the control device, whether communications that the base station accommodates are congested, based on the obtained information;
identifying, by the control device, a terminal accommodated in the base station in which communications are determined to be congested, as a terminal of which communications the proxy device is to control;
controlling, by the proxy device, communications between the base station and the server, by using a protocol that acknowledges that the data has reached a reception side;
calculating, by the proxy device, a loss rate at which communications by the identified terminal are to be discarded, by utilizing acknowledgement packets that used in the protocol;
relaying, by the proxy device, a communication of the identified terminal, by a transmission band from which a portion of the calculated loss rate has been reduced;
obtaining, by the proxy device using the protocol, snd as the number of transmitted packets, ack as the number of acknowledgement packets that indicate that the transmitted packets has reached the reception side, its as the number of packets of which retransmission has been requested, and sack.dup as the number of selective response packets when a value held by the acknowledgement packets is the same as a value held by selective response packets received immediately before, in the selective response packets that follow the acknowledgement packet and also that indicates a start end and a terminal end of a discontinuous portion of packets at the reception side, and
calculating, by the proxy device, rts/snd as the loss rate when snd >ack+rts, and
calculating, by the proxy device, 1−(ack−sack.dup)/snd as the loss rate when snd <=ack+rts.

13. The control method according to claim 12, further comprising:
connecting the proxy device, via a network interface, to a gateway which is installed between the base station and the server, to receive from the control device an identifier that indicates the identified terminal and forward a communication of the identified terminal to the proxy device based on the received identifier.

14. The control method according to claim 12, further comprising:
providing the proxy device in a gateway which is installed between the base station and the server, to receive from the control device an identifier that indicates the identified terminal and forward a communication of the identified terminal to the proxy device based on the received identifier.

15. The control method according to claim 12, further comprising:
installing the proxy device, between a public data network that connects the base station and the server with one another, and a gateway which is installed between the public data network and the base station.

16. A proxy device provided in a communication system including a base station that communicates with the terminal by radio transmission, a server that provides services to the terminal, and a control device that obtains information for determining whether communications which the base station accommodates are congested, and identifies a terminal that is accommodated in the base station in which it is determined that the communications are congested, as a terminal of which communications the proxy device is to control, the proxy device comprising:

a memory storing one or more programs; and a processor that operates in accordance with the programs;

wherein the processor is configured to control communications between the base station and the server, by using a protocol that acknowledges that the data has reached a reception side, calculate a loss rate at which communications by the identified terminal are to be discarded, by utilizing acknowledgement packets which are used by the protocol, relay a communication of the identified terminal, by a transmission band which has been reduced by the calculated loss rate portion, obtain, by using the protocol, snd as the number of transmitted packets, ack as the number of acknowledgement packets that indicate that the transmitted packets has reached the reception side, rts as the number of packets of which retransmission has been requested, and sack.dup as the number of selective response packets when a value held by the acknowledgement packets is the same as a value held by selective response packets received immediately before, in the selective response packets that follow the acknowledgement packet and also that indicates a start end and a terminal end of a discontinuous portion of packets at the reception side, and calculate rts/snd as the loss rate when snd >ack+rts, and calculate 1−(ack−sack.dup)/snd as the loss rate when snd <=ack+rts.

17. The proxy device according to claim 16, wherein the proxy device is connected, via a network interface, to a gateway which is installed between the base station and the server, to receive from the control device an identifier that indicates the identified terminal and forward a communication of the identified terminal to the proxy device based on the received identifier.

18. The proxy device according to claim 16, wherein the proxy device is provided in a gateway which is installed between the base station and the server, to receive from the control device an identifier that indicates the identified terminal and forward a communication of the identified terminal to the proxy device based on the received identifier.

19. The proxy device according to claim 16, wherein the proxy device is installed, between a public data network that connects the base station and the server with one another, and a gateway which is installed between the public data network and the base station.

20. The communication system according to claim 4, wherein the control device is configured to set the upper limit value of the transmission band of the identified terminal, as being equal to the upper limit of the transmission band included in the terminal information which has been reduced by the calculated loss rate portion.

\* \* \* \* \*